United States Patent
Li et al.

(10) Patent No.: US 12,314,547 B2
(45) Date of Patent: May 27, 2025

(54) VIDEO PROCESSING METHOD AND APPARATUS, ELECTRONIC DEVICE AND STORAGE MEDIUM

(71) Applicant: Beijing Zitiao Network Technology Co., Ltd., Beijing (CN)

(72) Inventors: Gen Li, Beijing (CN); Haiqiang Jiang, Beijing (CN); Ruoxi Wang, Beijing (CN); Qizheng Rao, Beijing (CN); Huayun Miao, Beijing (CN); Chunhao Hu, Beijing (CN); Ziqiang Zhu, Beijing (CN); Hongshuai Zhao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/759,700

(22) Filed: Jun. 28, 2024

(65) Prior Publication Data

US 2024/0353982 A1    Oct. 24, 2024

Related U.S. Application Data

(63) Continuation of application No. PCT/CN2023/106984, filed on Jul. 12, 2023.

(30) Foreign Application Priority Data

Jul. 19, 2022   (CN) .......................... 202210855134.6

(51) Int. Cl.
    *G06F 3/0484*   (2022.01)
    *G06F 3/0488*   (2022.01)

(52) U.S. Cl.
    CPC .......... *G06F 3/0484* (2013.01); *G06F 3/0488* (2013.01); *G06F 2203/04804* (2013.01)

(58) Field of Classification Search
    CPC . G06F 3/0484; G06F 3/0488; G06F 2203/048
    See application file for complete search history.

(56) References Cited

U.S. PATENT DOCUMENTS 10,762,769 B1 *   9/2020   Sommerlatt .......... G08B 25/12
2014/0176479 A1   6/2014   Wardenaar
(Continued)

FOREIGN PATENT DOCUMENTS

CN    105872647 A    8/2016
CN    105939480 A    9/2016
(Continued)

OTHER PUBLICATIONS

Chunxia et al., "A Variety of Implementation Methods of Waterfall Flow Layout and Their Comparison Computer Knowledge and Technology", vol. 12, No. 25, Sep. 2016, 3 pages.
(Continued)

*Primary Examiner* — Phuong H Nguyen
(74) *Attorney, Agent, or Firm* — Astute IP Law Group

(57) ABSTRACT

A video processing method and apparatus, an electronic device, and a storage medium are disclosed. The method includes: displaying current video content on a video playback page; displaying a preset event trigger region on the video playback page in response to swiping the current video content; and performing preset event trigger control on the current video content through the preset event trigger region.

20 Claims, 15 Drawing Sheets

(56) References Cited

U.S. PATENT DOCUMENTS

| | | | |
|---|---|---|---|
| 2015/0113407 A1 | 4/2015 | Hoffert et al. | |
| 2017/0064374 A1* | 3/2017 | Eim | G06F 3/0485 |
| 2017/0289619 A1* | 10/2017 | Xu | H04N 21/25866 |
| 2020/0396496 A1 | 12/2020 | Ding et al. | |
| 2020/0396498 A1 | 12/2020 | Wang | |
| 2022/0050582 A1* | 2/2022 | Zhou | G06F 3/0485 |
| 2023/0140948 A1* | 5/2023 | Li | H04N 21/4788 725/14 |

FOREIGN PATENT DOCUMENTS

| | | |
|---|---|---|
| CN | 108924633 A | 11/2018 |
| CN | 109104630 A | 12/2018 |
| CN | 109656653 A | 4/2019 |
| CN | 110149557 A | 8/2019 |
| CN | 110620949 A | 12/2019 |
| CN | 111580718 A | 8/2020 |
| CN | 112423122 A | 2/2021 |
| CN | 113110783 A | 7/2021 |
| CN | 113923499 A | 1/2022 |
| CN | 114415928 A | 4/2022 |
| CN | 115119040 A | 9/2022 |
| CN | 115119040 B | 1/2024 |
| JP | 2013175214 A | 9/2013 |
| JP | 2017536783 A | 12/2017 |
| KR | 10-2019-0142361 A | 12/2019 |
| WO | 2020/133373 A1 | 7/2020 |
| WO | 2021/218519 A1 | 11/2021 |

OTHER PUBLICATIONS

International Search Report and Written Opinion for PCT/CN2023/106984, mailed Oct. 11, 2023, 10 pages.

Notice of Allowance for Chinese Patent Application No. 202210855134.6, mailed Jan. 4, 2024, 6 pages.

Office Action for Chinese Patent Application No. 202210855134.6, mailed Jul. 25, 2023, 16 pages.

Shanshan et al., "Research on Interface Design Strategies of Online Course Video Based on Cognitive Load", 2020 International Conference on Innovation Design and Digital Technology, Aug. 30, 2021, 8 pages.

Xiaoxing et al., "Research on Mobile Layout Design Based on Waterfall Flow", The Grand View of Art, No. 7, Aug. 7, 2017, 3 pages, with English Abstract.

Notice of Acceptance for Australian Patent Application No. 2023309624, mailed on Nov. 21, 2024, 3 pages.

Office Action for Japanese Patent Application No. 2024-539573, mailed on Dec. 17, 2024, 12 pages.

Request for the Submission of an Opinion for Korean Patent Application No. 10-2024-7023379, mailed on Nov. 1, 2024, 13 pages.

Extended European Search Report for European Patent Application No. 23842182.0, mailed on Mar. 24, 2025, 11 pages.

* cited by examiner

VIDEO PROCESSING METHOD AND APPARATUS, ELECTRONIC DEVICE AND STORAGE MEDIUM

CROSS-REFERENCE TO RELATED APPLICATIONS

The present application is a continuation of International Patent Application No. PCT/CN2023/106984, filed on Jul. 12, 2023, which claims the priority of the Chinese Patent Application No. 202210855134.6 filed with the China National Intellectual Property Administration on Jul. 19, 2022, the entire contents disclosed by the Chinese patent application are hereby incorporated by reference.

TECHNICAL FIELD

The present disclosure relates to the field of computer technology, in particular to a video processing method and apparatus, an electronic device and a storage medium.

BACKGROUND

The video playback page incorporates interactive functionalities for engaging with the video content. For instance, on a video platform with waterfall videos, if a viewer finds a video on the video playback page uninteresting, they need to long-press the screen to reveal a popup panel. By triggering the "Not Interested" control on the panel, interactive feedback on the video content is provided. However, the "Not Interested" control is hidden beneath the panel, making it challenging to understand the precise situation, and it requires a series of actions including long-pressing and clicking, thus increasing the operation cost.

SUMMARY

The present disclosure provides a video processing method, apparatus, electronic device and storage medium.

An embodiment of the present disclosure provides a video processing method, including:
  displaying current video content on a video playback page;
  displaying a preset event trigger region on the video playback page when swiping the current video content; and
  performing preset event trigger control on the current video content through the preset event trigger region.

An embodiment of the present disclosure further provides a video processing apparatus, including:
  a current video content display module, configured to display current video content on a video playback page;
  a preset event trigger region display module, configured to display a preset event trigger region on the video playback page when swiping the current video content; and
  a preset event trigger control module, configured to perform preset event trigger control on the current video content through the preset event trigger region.

An embodiment of the present disclosure further provides an electronic device, which includes:
  one or more processors;
  a storage apparatus configured to store one or more programs;
  when the one or more programs are executed by the one or more processors, the one or more processors are caused to implement the video processing method according to any one of the embodiments of the present disclosure.

An embodiment of the present disclosure further provides a storage medium containing computer-executable instructions, wherein the computer-executable instructions, when executed by a computer processor, perform the video processing method according to any one of the embodiments of the present disclosure.

DETAILED DESCRIPTION

Figure 1:
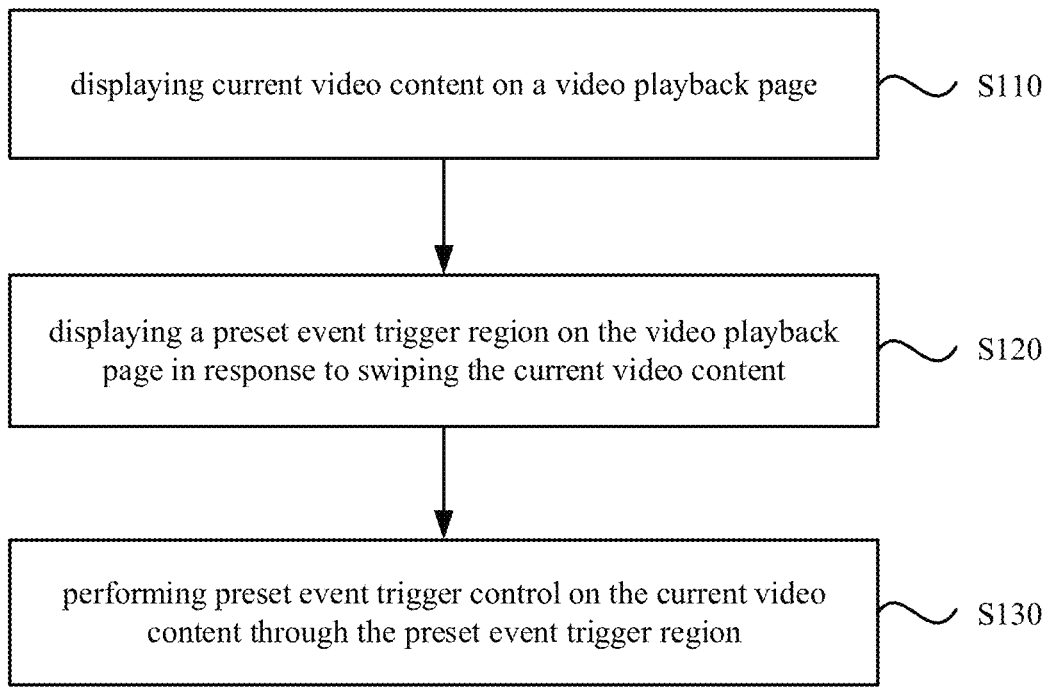
FIG. 1 is a flow diagram of a video processing method according to embodiments of the present disclosure.

Embodiments of the present disclosure will be described in more detail below with reference to the drawings. While certain embodiments of the present disclosure are shown in the drawings, the present disclosure may be embodied in various forms and should not be construed as limited to the embodiments set forth herein. Rather, these embodiments are provided for understanding the present disclosure. It should be understood that the drawings and embodiments of the present disclosure are only for exemplary purposes and are not intended to limit the protection scope of the present disclosure.

Various steps recorded in the implementation modes of the method of the present disclosure may be performed according to different orders and/or performed in parallel. In addition, the implementation modes of the method may include additional steps and/or omit the illustrated steps. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

The concepts such as "first", "second", etc. mentioned in the present disclosure are only used to distinguish different devices, modules or units, and are not used to limit the order of functions performed by these devices, modules or units or interdependence relationship.

The modifications of "a" and "a plurality" mentioned in the present disclosure are illustrative rather than restrictive, and unless the context clearly indicates otherwise, they should be understood as "one or a plurality of".

The names of messages or information exchanged between multiple devices in the embodiments of the present disclosure are only for illustrative purposes, and are not intended to limit the scope of these messages or information.

Before using the technical schemes disclosed in several embodiments of the present disclosure, users should be informed of the types, scope of use, and usage scenarios of personal information involved in the present disclosure in an appropriate way in accordance with relevant laws and regulations, and user authorization is required.

For example, in response to receiving a proactive request from a user, a prompt message is sent to the user, explicitly stating that the operation the user requested will necessitate acquiring and utilizing the user's personal information so that the user can decide whether to provide personal information to software or hardware such as electronic devices, applications, servers or storage media that perform the operation of the technical scheme of the present disclosure according to the prompt message.

As an alternative and non-restrictive implementation mode, in response to receiving the proactive request from the user, the way to send the prompt message to the user can be, for example, in the form of a pop-up window, in which the prompt message can be presented in text. In addition, the pop-up window can also contain selection controls "agree" and "disagree" for the user to choose regarding the provision of personal information to electronic devices.

The above notification and user authorization procedures are illustrative and do not limit the implementation modes of the present disclosure. Other methods that comply with relevant laws and regulations may also be applied in the implementation modes of the present disclosure.

FIG. 1 is a flow diagram of a video processing method according to embodiments of the present disclosure. The embodiments of the present disclosure are suitable for triggering a preset event of a video. The method may be performed by a video processing apparatus, which can be implemented in the form of software and/or hardware, and is generally integrated into any electronic device with a network communication function, such as a mobile terminal, a personal computer (PC) or a server. As shown in FIG. 1, the video processing method provided by this embodiment may include the following steps.

In S110, displaying current video content on a video playback page.

Figure 2:
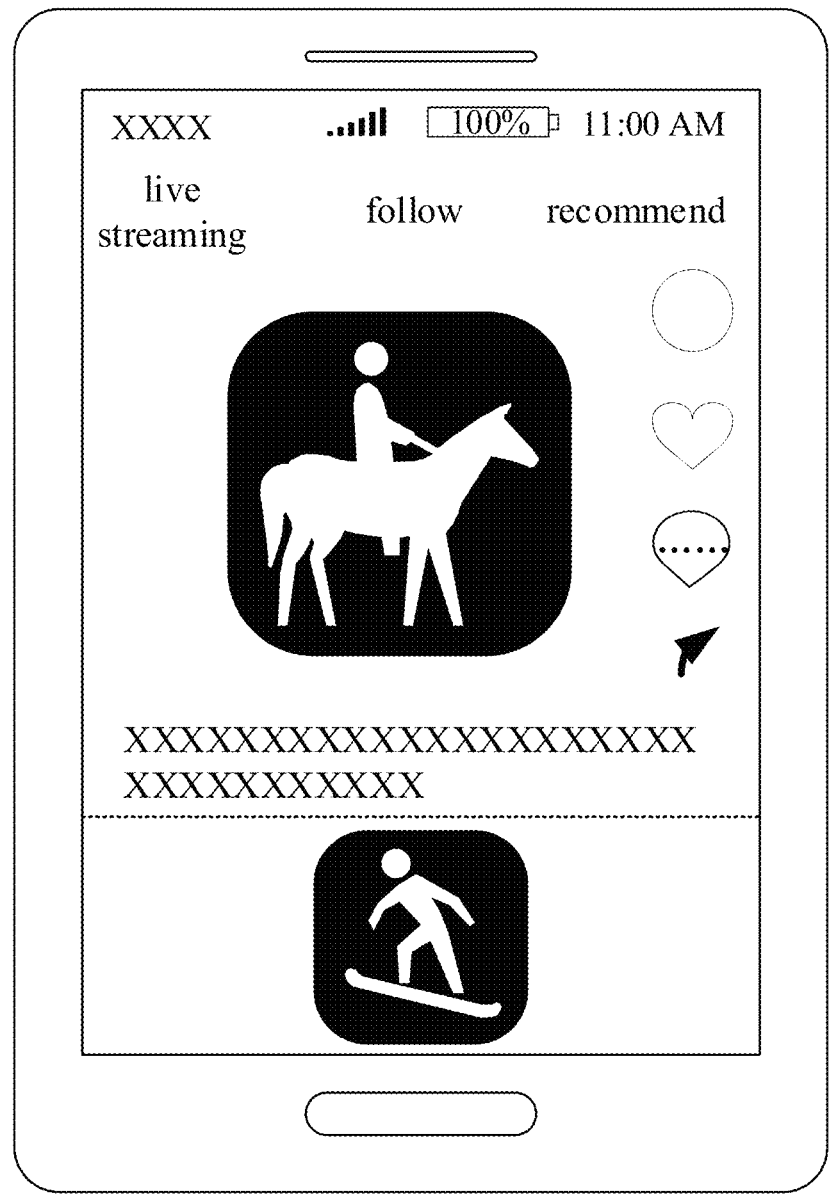
FIG. 2 is a schematic diagram of a video playback page according to embodiments of the present disclosure.

The video playback page may refer to a page for playing video content, such as application pages of various short video applications, and the video content played on the video playback page may be switched by swiping up and down. For example, referring to FIG. 2, the next video content may be obtained by swiping the current video content on the video playback page up and down. For example, the current video content may be horse riding video content shown in FIG. 2, and correspondingly, the next video content may be skiing video content shown in FIG. 2.

In S120, displaying a preset event trigger region on the video playback page in response to swiping the current video content.

The preset event trigger region may refer to a region where preset event trigger feedback is performed on the video content. For example, referring to FIG. 3, taking the preset event "Not Interested" as an example, by swiping the current video content up and down on the video playback page, a "Not Interested" event trigger region for the current video content in FIG. 3 may be displayed on the video playback page.

As an alternative and non-restrictive implementation mode, a relative distance between the preset event trigger region and a page bottom of the video playback page is preset based on the distribution of swiping actions on the video content on the video playback page.

A display position of the preset event trigger region on the video playback page, that is, the relative distance between the preset event trigger region and the page bottom of the video playback page may be preset. Alternatively, the display position of the preset event trigger region on the video playback page may be set according to the distribution positions of swiping actions on a plurality of pieces of video content played on the video playback page.

Figure 3:
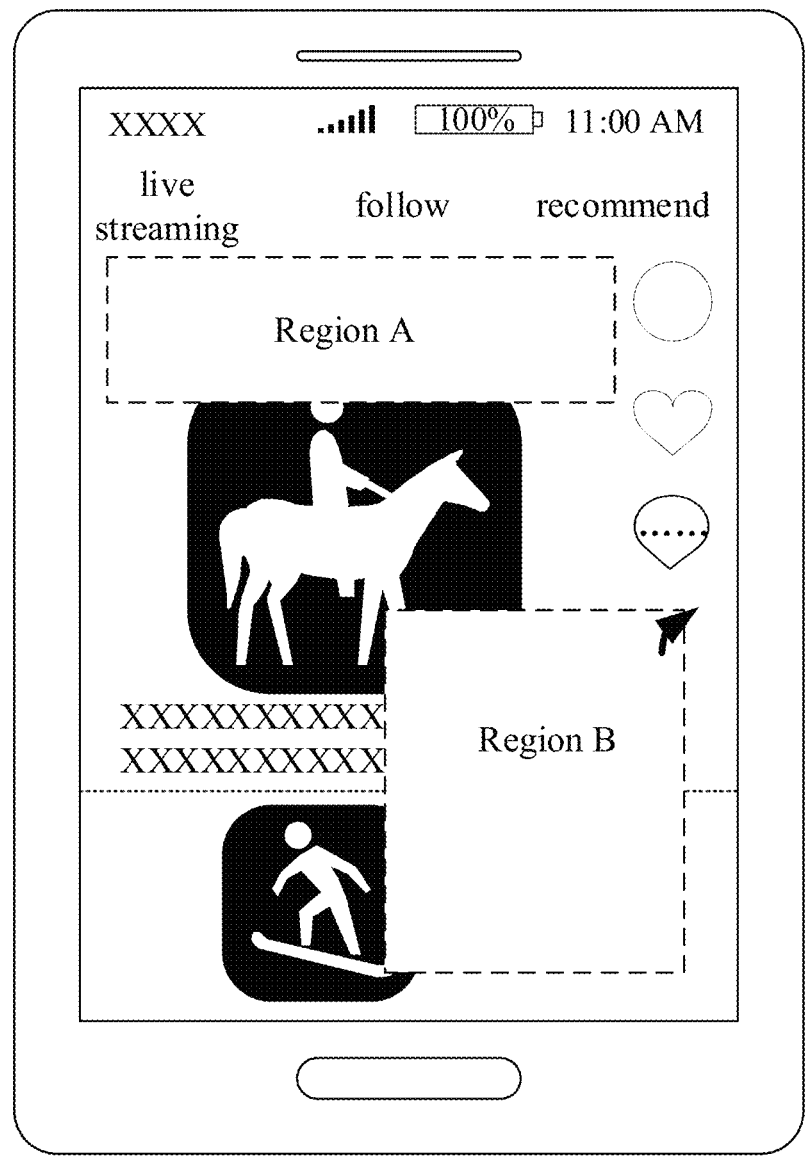
FIG. 3 is a schematic diagram of a video playback page according to embodiments of the present disclosure.

For example, users mostly act on the bottom of the video playback page when swiping the video content, such as region B in FIG. 3. In the present application, the preset event trigger region may be positioned at three-quarters from the page bottom of the video playback page, for instance, it may be set in region A as demonstrated in FIG. 3. Placing the preset event trigger region in region A helps prevent users from accidentally triggering the "Not Interested" region while swiping normally.

As an alternative and non-limiting implementation mode, before displaying the preset event trigger region on the video playback page, the method may also include:
   when detecting a touch-swiping operation applied to the current video content, making the current video content displayed on the video playback page begin to move in a preset direction, so that the next video content begins to appear on the video playback page.

Figure 4:
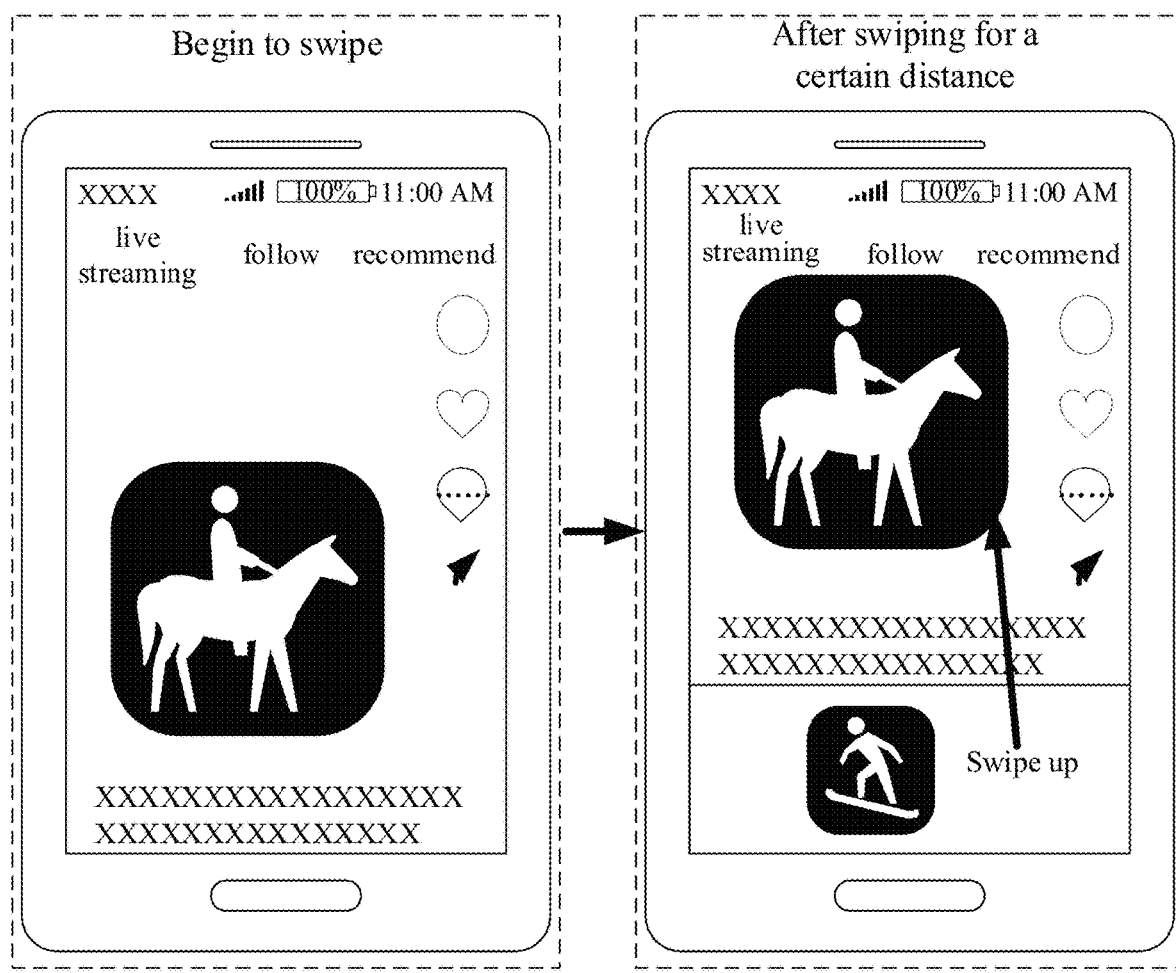
FIG. 4 is a schematic diagram illustrating a swipe-up operation applied to current video content according to embodiments of the present disclosure.

Detecting the touch-swiping operation applied to the current video content, and the touch-swiping operation includes a swipe-up operation and a swipe-down operation applied to the video playback page by a user. Referring to FIG. 4, when beginning to swipe, the current video content is displayed on the video playback page, and when detecting a swipe-up operation applied to the current video content, the current video content begins to move upward, so that the next video content begins to appear on the video playback page below the current video content. Here, the current video content and the next video content move synchronously in the swiping direction with the touch-swiping operation on the video playback page.

As an alternative and non-restrictive implementation mode, the touch-swiping operation may also be a swipe-down operation applied to the video playback page by a user. When a swipe-down operation applied to the current video content is detected, the current video content begins to move downward, so that the next video content begins to appear on the video playback page above the current video content.

As an alternative and non-restrictive implementation mode, displaying the preset event trigger region on the video playback page may further include:

in response to displaying the preset event trigger region on the video playback page, gradually adjusting a region size of the preset event trigger region as the current video content is swiped.

Figure 5:
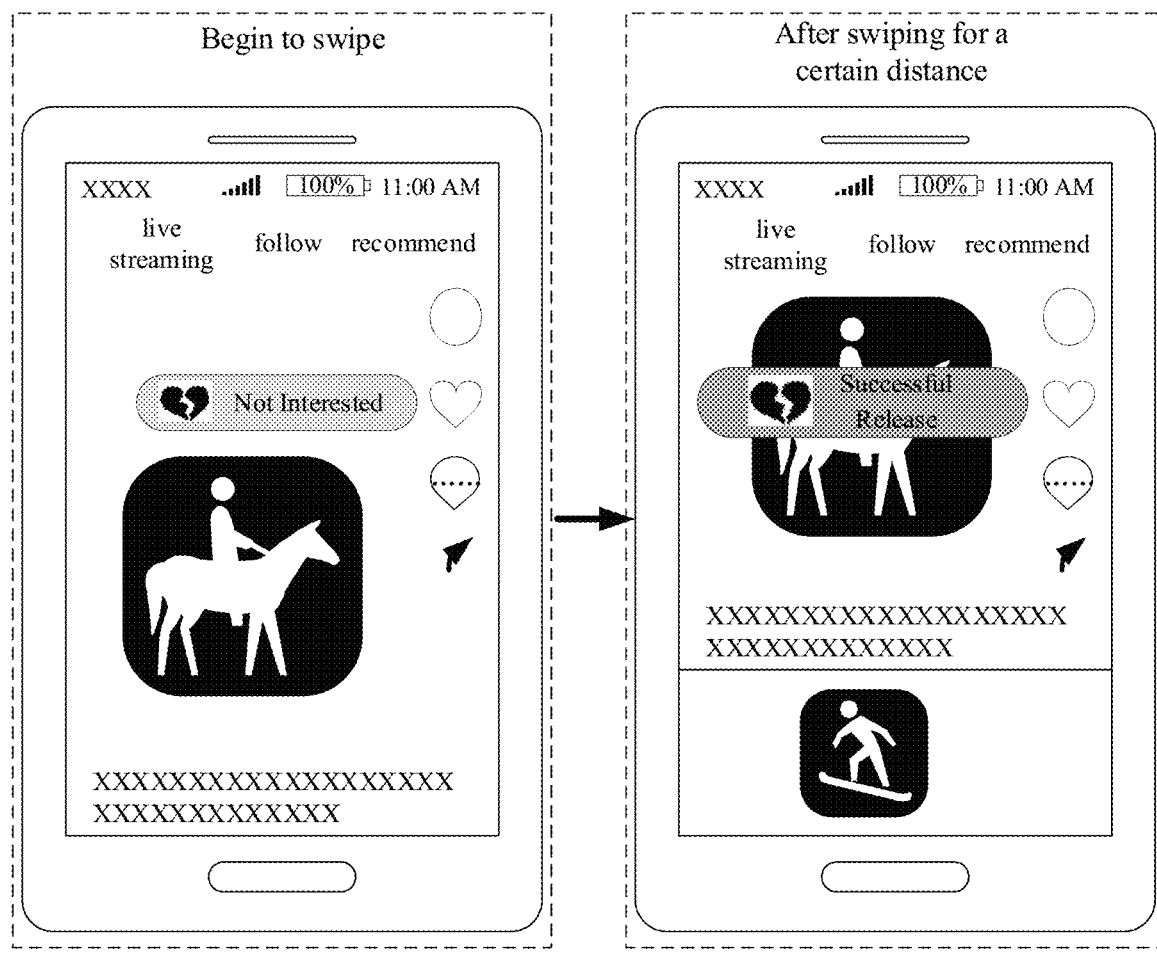
FIG. 5 is a schematic diagram illustrating the gradual adjustment of a preset event trigger region with the sliding of the current video content according to embodiments of the present disclosure.

Referring to FIG. 5, when the current video content displayed on the video playback page moves upward, the region size of the preset event trigger region for the current video content may be gradually adjusted with the sliding of the current video content. Alternatively, the region size of the preset event trigger region may gradually increase with the sliding of the current video content, which will stop when the region size reaches a preset size or when a preset event is triggered. Referring to FIG. 5, it is not difficult to find that with the continuous sliding of the current video content, the region size of the preset event trigger region displayed on the video playback page after a certain distance of sliding obviously increases compared with the region size of the preset event trigger region at the beginning of the display. The increased size serves as a prompt to users about the potential triggering of the preset event, reminding the users to be aware of its activation.

For example, referring to FIG. 5, when the preset event trigger region is initially displayed on the video playback page, the region size of the preset event trigger region may be one-tenth of an entire screen of a video-playing device. With the sliding of the current video content, the region size of the preset event trigger region gradually increases, and finally, the preset event trigger region may reach twice the region size of the preset event trigger region at the beginning of sliding. The region size of the preset event trigger region is not limited in the embodiments of the present disclosure.

Alternatively, the region size of the preset event trigger region should not be too large, as a large preset event trigger region may interfere with users' regular operations. Conversely, if the preset event trigger region is too small, the informative impact on users through the preset event trigger region will be reduced, thus failing to effectively guide users.

As an optional and non-restrictive implementation mode, displaying the preset event trigger region on the video playback page may further include:

in response to displaying the preset event trigger region on the video playback page, gradually adjusting a background color of the preset event trigger region as the current video content is swiped.

Referring to FIG. 5, the background color of the preset event trigger region is gradually adjusted with the sliding of the current video content. The gradual adjustment may mean that the background color of the preset event trigger region gradually darkens. Here, a transparency of the preset event trigger region falls within a preset transparency range, allowing a part of the video content blocked by the preset event trigger region to be blurred but visible. For example, at the beginning of the sliding, the background color of the preset event trigger region is light, which may refer to a frosted glass-like effect, so as not to affect the user's viewing of the current video content; and after a certain distance of the sliding of the current video content, the background color of the preset event trigger region gradually darkens, which could be a dark gray color. With the sliding of the current video content, the background color of the preset event trigger region is gradually adjusted, serving as a visual prompt for users.

As an alternative and non-restrictive implementation mode, displaying the preset event trigger region on the video playback page may further include:

synchronously displaying a preset event trigger prompt message to indicate that it is allowed to trigger a preset event for the current video content while swiping the current video content.

The preset event trigger prompt message may refer to a preset prompt message displayed in the preset event trigger region. Referring to FIG. 5, in an alternative scheme of the embodiments of the present disclosure, taking the preset event "Not Interested" as an example, the preset event trigger prompt message may be "Not Interested" and the like. When starting to display the current video content and display the preset event trigger region, the preset event trigger prompt message such as "Not Interested" may be displayed in the preset event trigger region synchronously.

In S130, performing preset event trigger control on the current video content through the preset event trigger region.

The preset event trigger control may involve marking the current video content as "Not Interested" video based on a trigger operation on the current video content by the user. For instance, swiping the current video content into the preset event trigger region will mark the current video content as a Not Interested video.

As an alternative and non-restrictive implementation mode, performing preset event trigger control on the current video content through the preset event trigger region may include:

triggering a preset event for the current video content displayed on the video playback page after detecting that a touch-swiping operation performed on the current video content enters the preset event trigger region.

Figure 6A:
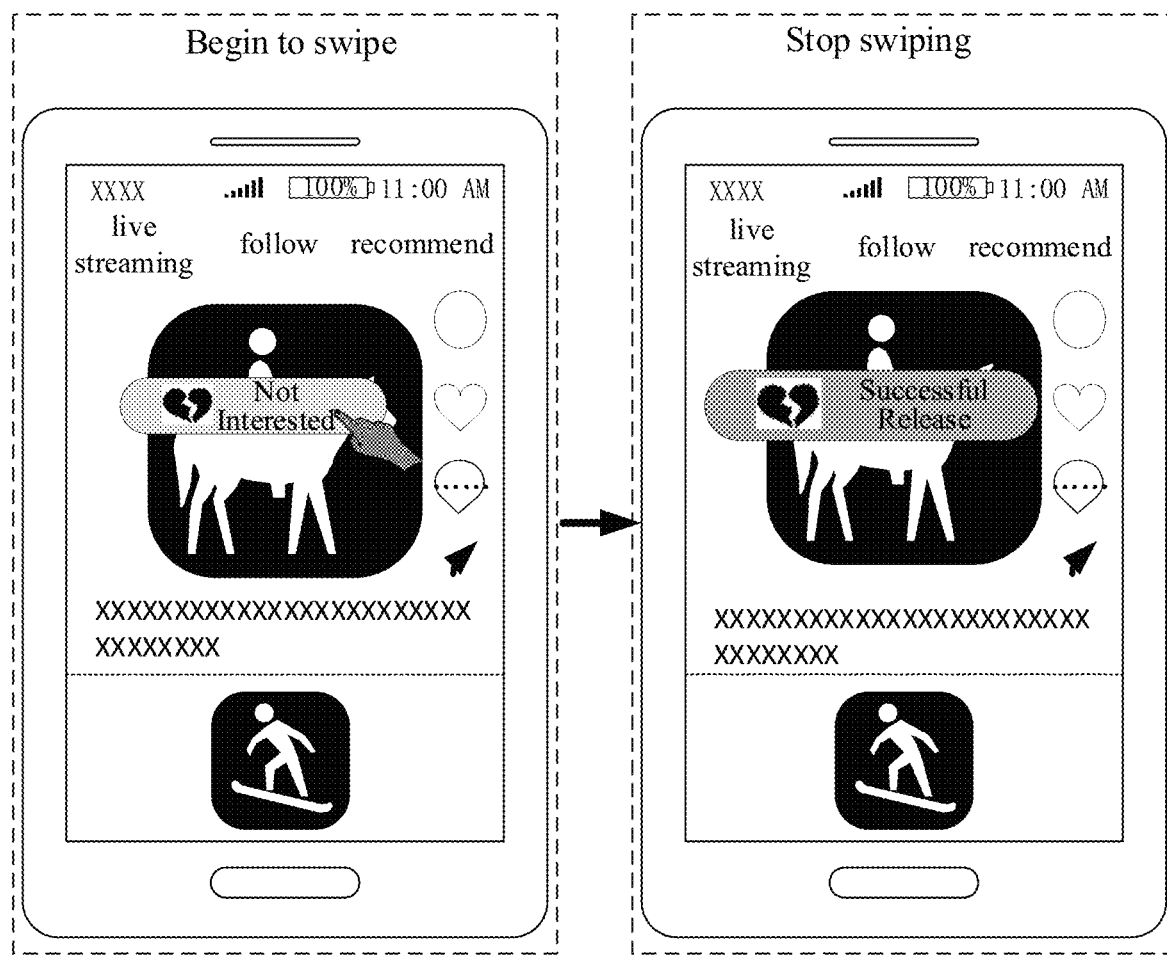
FIG. 6A is a schematic diagram illustrating a touch-swiping operation applied to current video content according to embodiments of the present disclosure.

Referring to FIG. 6A, when detecting a touch-swiping operation on the current video content, triggering the "Not Interested" region on the video playback page.

Alternatively, triggering the preset event for the current video content displayed on the video playback page includes: triggering the preset event for the current video content displayed on the video playback page when waiting the touch-swiping operation to be finished in the preset event trigger region.

Referring to FIG. 6A, detecting that the touch-swiping operation occurs within the preset event trigger region, and when the touch-swiping operation is finished within the preset event trigger region, displaying a result of triggering the preset event for the current video content on the video playback page, that is, "Successful Release".

As an alternative and non-restrictive implementation mode, triggering the preset event for the current video content displayed on the video playback page further includes:

performing state change processing on the preset event trigger region to indicate that the preset event has been triggered for the current video content.

When detecting the touch-swiping operation and ending the touch-swiping operation, performing state change processing on the preset event trigger region, that is, when the touch-swiping operation is detected, "Not Interested" is displayed on the preset event trigger region, and when it is detected that the touch-swiping operation is finished, "Successful Release" is displayed on the preset event trigger region. By performing state change processing on the preset event trigger region, users are prompted to categorize the current video content as "Not Interested", and similar video content will not be played in subsequent video content.

As an alternative and non-restrictive implementation mode, performing preset event trigger control on the current video content through the preset event trigger region may include:

triggering a preset event for the current video content displayed on the video playback page when detecting that a reference sign on the current video content enters the preset event trigger region.

Figure 6B:
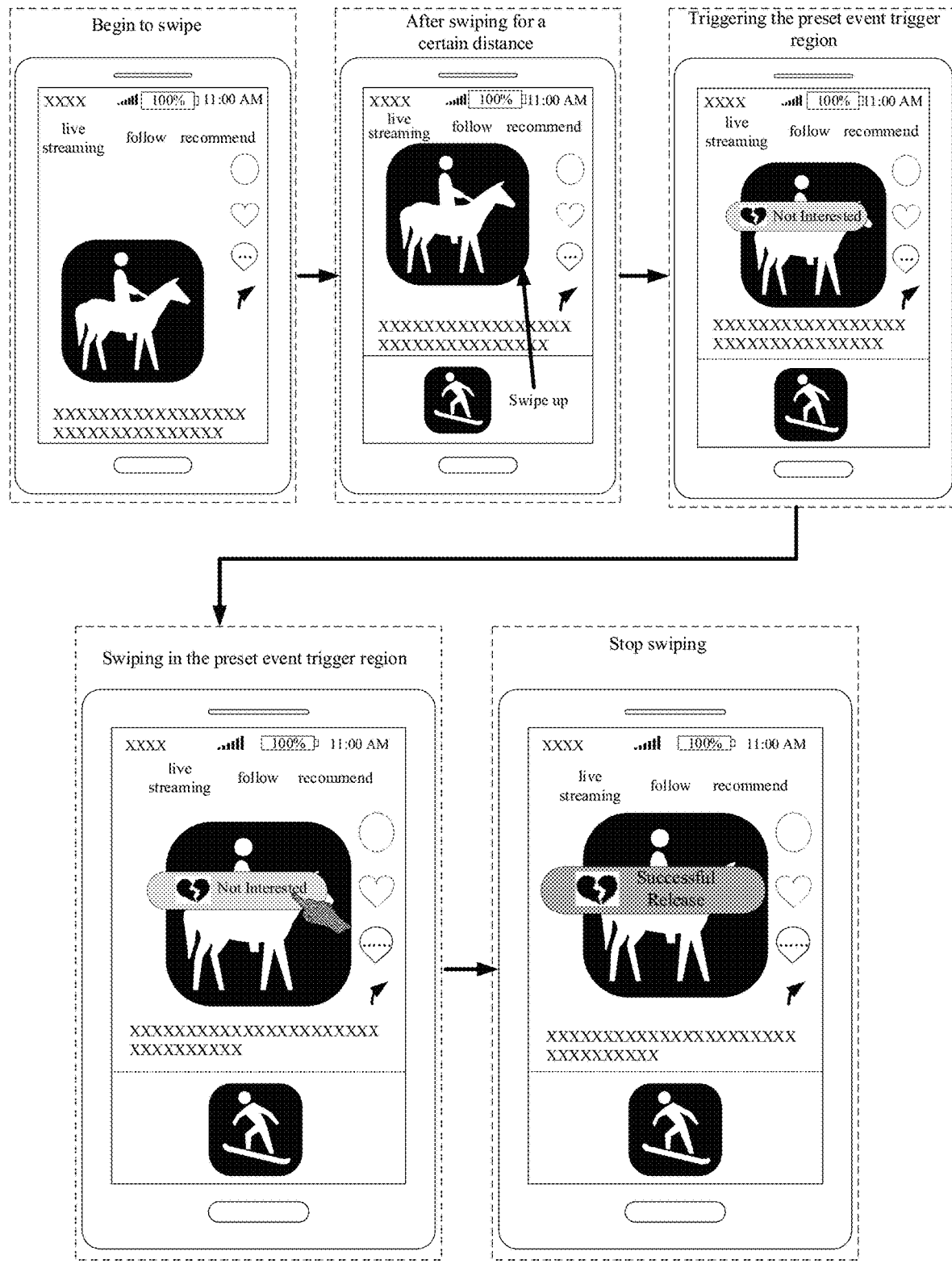
FIG. 6B is a schematic diagram of a video processing method according to embodiments of the present disclosure.

Referring to FIG. 6B, the current video content is displayed on the video playback page, and in response to performing a swipe-up operation on the current video content displayed on the video playback page, the next video content begins to be displayed on the video playback page. When the swipe-up operation on the current video content displayed on the video playback page meets a preset swiping operation condition (for example, after swiping for a preset distance), the preset event trigger region is displayed on the video playback page. The swipe-up operation on the current video content is continued, ensuring that the touch-swiping is done within the preset event trigger region. When the touch-swiping distance in the preset event trigger region exceeds the preset distance and the touch-swiping operation is finished, performing preset event trigger control on the current video content; alternatively, when the touch-swiping duration in the preset event trigger region exceeds the preset duration and the touch-swiping operation is finished, performing preset event trigger control on the current video content, so as to mark the current video content as a preset event, such as marked as a Not Interested video.

Figure 7:
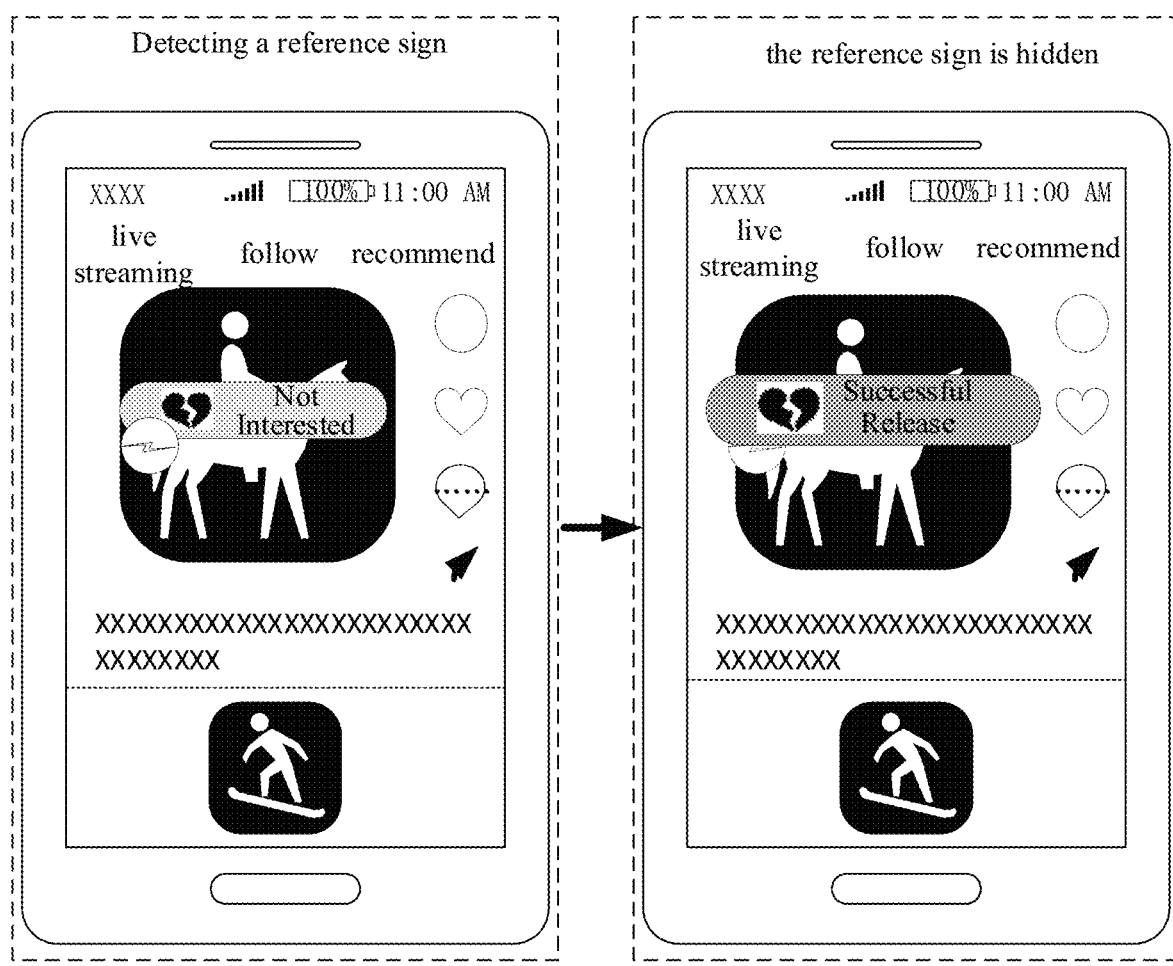
FIG. 7 is a schematic diagram illustrating a reference sign entering the preset event trigger region according to embodiments of the present disclosure.

Referring to FIG. 7, taking the "lightning bolt" in FIG. 7 as a reference sign, after detecting that the reference sign enters the preset event trigger region on the current video content, triggering the preset event for the current video content, that is, triggering the "Not Interested" region on the current video content.

Alternatively, triggering the preset event for the current video content displayed on the video playback page includes: triggering the preset event for the current video content displayed on the video playback page in response to the reference sign entering the preset event trigger region being hidden.

When the reference sign is hidden, it represents the completion of triggering the preset event for the current video content, and the preset event trigger region displays "Successful Release". Through state change in the preset event trigger region, users are informed of the completion of triggering the preset event for the current video content. Here, the hiding of the reference sign on the current video content indicates the ending of the touch-swiping operation within the preset event trigger region, and the hiding of the reference sign may involve the disappearance of the reference sign, the color hiding of the reference sign and/or the outline of the reference sign becoming a dashed line, for example, in FIG. 7, the outline of "lightning bolt" is changed into a dashed line. The selection of the reference sign, such as the "lightning bolt", is not limited to the embodiments of the present disclosure.

As an alternative and non-restrictive implementation mode, triggering the preset event for the current video content displayed on the video playback page may further include:

controlling the preset event trigger region displayed on the video playback page to perform a picture shaking; and/or controlling a playing device for displaying the video playback page to provide tactile feedback.

Figure 8:
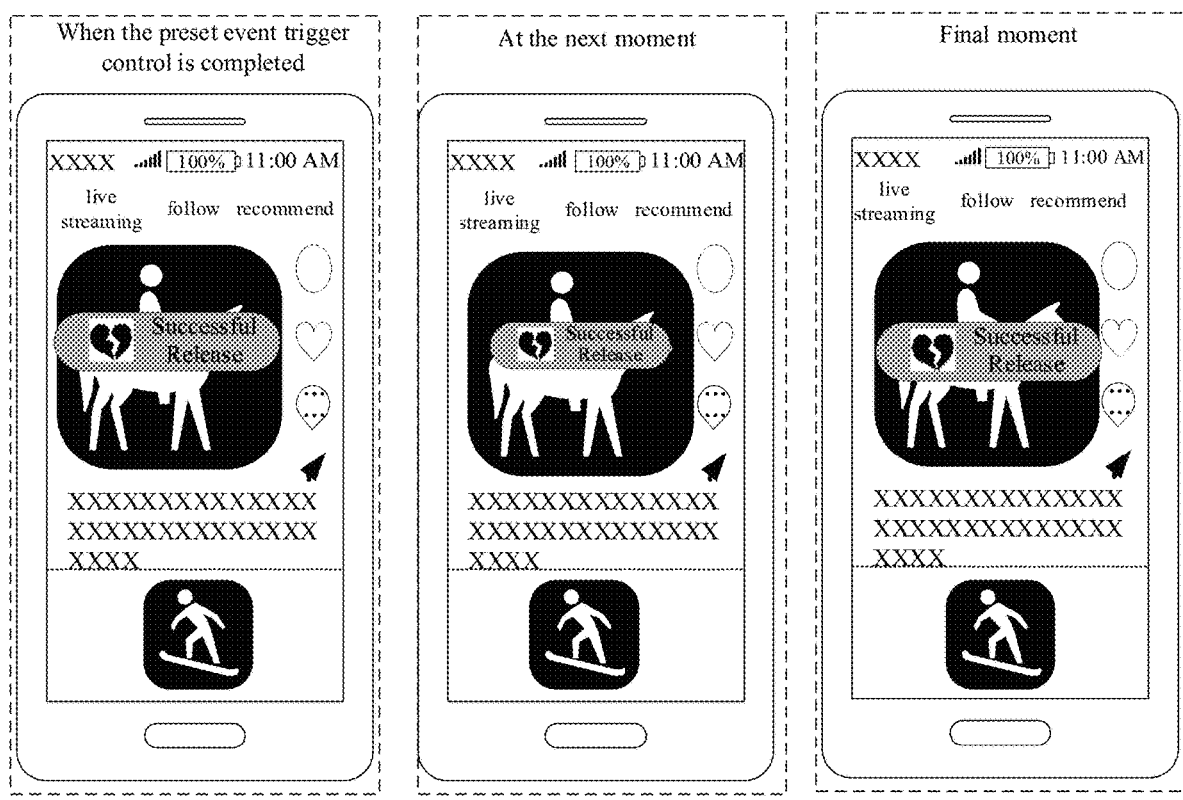
FIG. 8 is a schematic diagram illustrating picture shaking in a preset event trigger region according to embodiments of the present disclosure.

In an alternative scheme of the embodiments of the present disclosure, after performing preset event trigger control on the current video content, users can be informed of the completion of trigger control on the current video content by triggering picture shaking in the displayed preset event trigger region. Here, triggering picture shaking in the displayed preset event trigger region may refer to continuously zooming in and out the displayed preset event trigger region to realize the picture shaking of the preset event trigger region. For example, as shown in FIG. 8, when the preset event trigger control is completed, the preset event trigger region is in an enlarged state, and the preset event trigger region will shrink at the next moment, and ultimately return to its original enlarged state. In the embodiments of the present disclosure, by zooming in and out of the preset event trigger region, users are informed of the completion of the preset event trigger control.

In another alternative scheme of the embodiments of the present disclosure, after performing preset event trigger control on the current video content, users can also be informed of the completion of trigger control on the current video content by controlling a playing device for displaying the video playback page to provide tactile feedback. Here, the tactile feedback may involve the playing device displaying the video playback page vibrating to inform users of the completion of the preset event trigger control.

In yet another alternative scheme of the embodiments of the present disclosure, it is also possible to integrate triggering picture shaking in the preset event trigger region displayed on the video playback page with controlling the playing device for displaying the video playback page to provide tactile feedback, so that a stronger indication can be given to users regarding the completion of trigger control on the current video content.

In still another alternative scheme of the embodiments of the present disclosure, after performing the preset event trigger control on the current video content, dynamic feedback is also provided. Here, the dynamic feedback may involve displaying dynamic graphics on the current video content page to provide feedback. For example, a split heart pops up on the current video content page, and at the same time, the split heart gradually enlarges until it shatters. If the user ends the swiping operation at this point, it is considered that the "Not Interested" is successfully submitted.

According to the video processing method provided by the embodiments of the present disclosure, by integrating the operation of swiping up the current video to watch the next video with the operation of triggering events like "Not Interested", the uninterested events can be quickly fed back when the video is swiped up, which reduces the operating cost for users to trigger the feedback of "Not Interested" events, thus improving the penetration rate of "Not Interested" signals and facilitating improved video recommendations.

The video processing method provided by the embodiments of the present disclosure includes: displaying current video content on a video playback page; displaying a preset event trigger region on the video playback page in response to swiping the current video content; and performing preset event trigger control on the current video content through the preset event trigger region. By adopting the technical scheme of the embodiments of the present disclosure, by swiping the current video content displayed on the video playback page, the display of the preset event trigger region is triggered; users are prompted to mark the current video content as "Not Interested" content through the change of the region size of the preset event trigger region, the change of the background color, the change of the prompting content and the tactile feedback of the playing device; and by setting the position of the preset event trigger region, users are prevented from accidentally touching the "Not Interested" region while swiping normally. Through the embodiments of the present disclosure, the operational cost for users to provide feedback on "Not Interested" events is effectively reduced, thereby increasing the penetration rate of "Not Interested" signals and ultimately realizing the adjustment of video recommendations according to user preferences.

The content displayed in the preset event trigger region in the embodiments of the present disclosure can also be "Interested"; at the same time, triggering a preset event for the current video content can mark the current video content as "Interested" content, allowing users to mark "Interested" video content, so that the operational cost for users to provide feedback on "Interested" events is effectively reduced, thereby increasing the penetration rate of "Interested" signals and ultimately realizing the adjustment of video recommendations according to user preferences.

Figure 9:
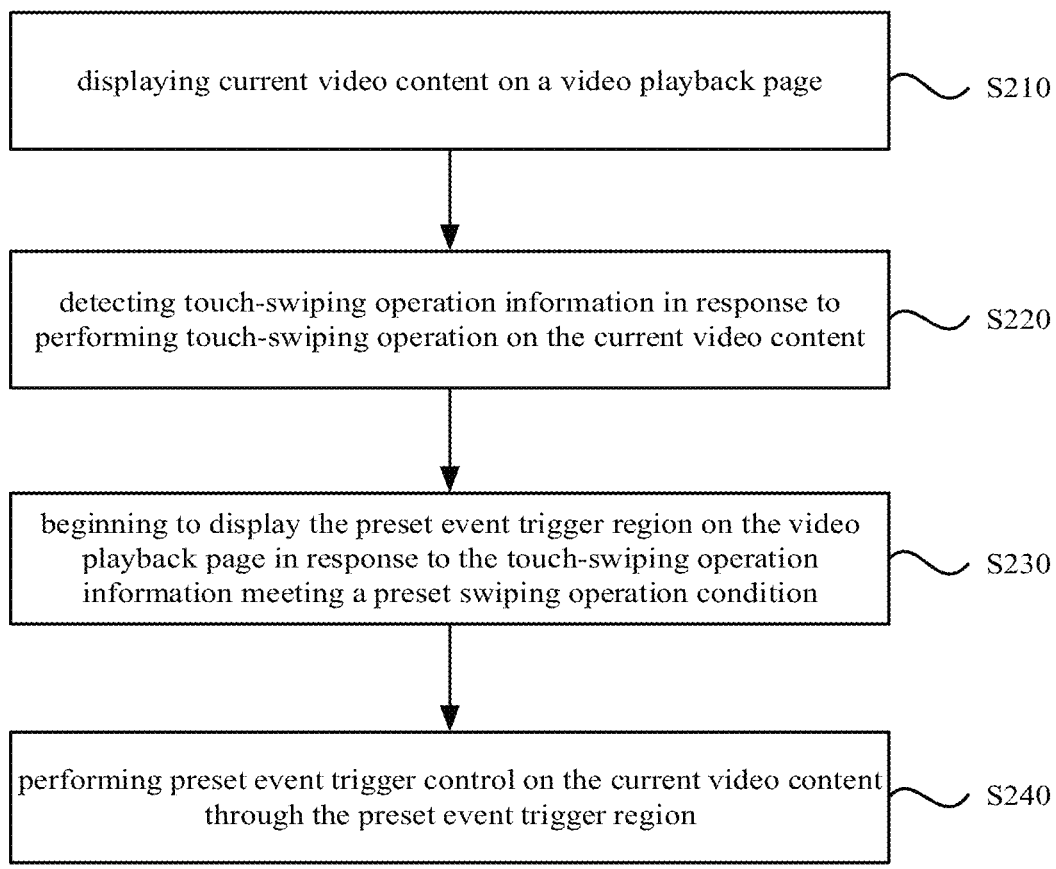
FIG. 9 is a flow diagram of another video processing method according to embodiments of the present disclosure.

FIG. 9 is a flow diagram of another video processing method according to embodiments of the present disclosure. The embodiments of the present disclosure explain the foregoing embodiments on the basis of the above embodiments, and the embodiments of the present disclosure can be combined with alternative schemes of one or more of the above embodiments. As shown in FIG. 9, the video processing method provided in the embodiments of the present disclosure may include the following steps.

In S210, displaying current video content on a video playback page.

In S220, detecting touch-swiping operation information in response to performing touch-swiping operation on the current video content.

The touch-swiping operation information may refer to information obtained when performing touch-swiping operation on the video playback page, and the touch-swiping operation information includes a continuous swiping distance and/or a touch position. Detecting a touch position when continuously performing touch-swiping operation on the current video content to determine the continuous swiping distance when continuously swiping the current video content.

As an alternative and non-restrictive implementation mode, detecting a touch position when continuously performing touch-swiping operation on the current video content includes steps C1-C2.

In C1, detecting at least two reference touch positions when continuously swiping the current video content.

Figure 10:
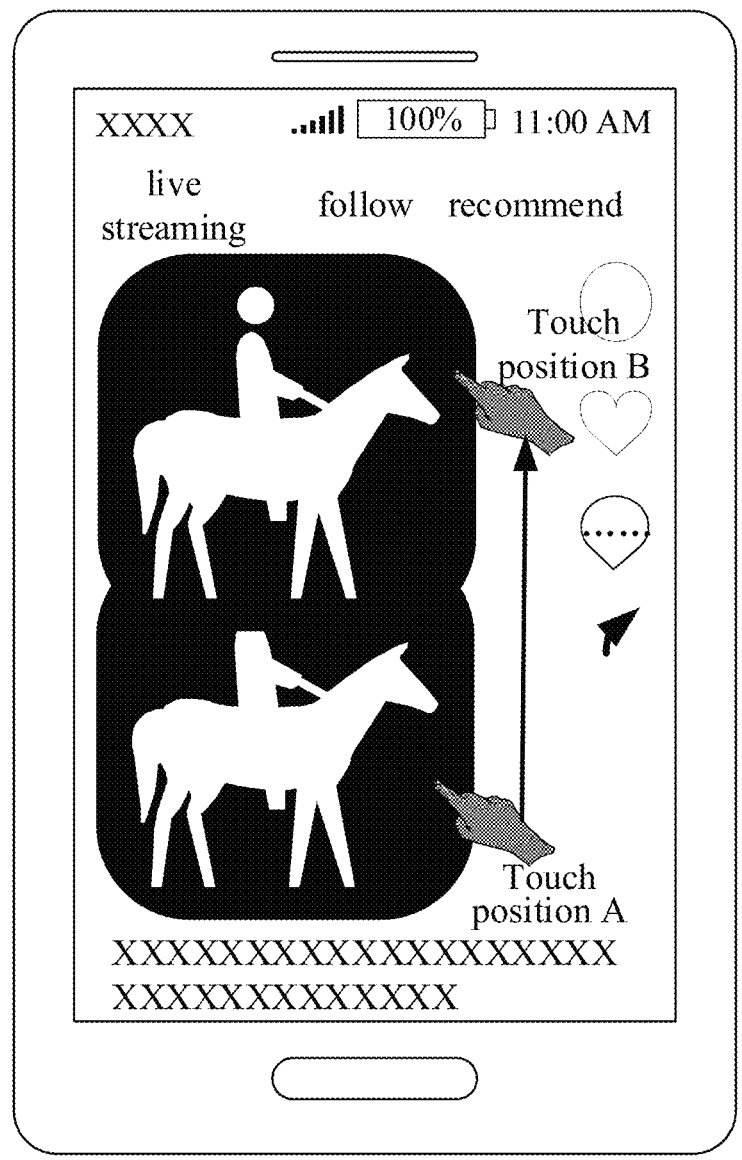
FIG. 10 is a schematic diagram of touch positions corresponding to continuous touch-swiping on the current video content according to embodiments of the present disclosure.

The at least two reference touch positions include a touch position when starting the touch-swiping operation on the current video content and a touch position when ending the touch-swiping operation. Referring to FIG. 10, continuously swiping from the touch position A to the touch position B, the touch position A is the touch position when the touch-swiping operation is started on the current video content, and the touch position B is the touch position before the touch-swiping operation is finished on the current video content.

In C2, determining a continuous swiping distance when continuously swiping the current video content according to the at least two reference touch positions.

Referring to FIG. 10, the continuous swiping distance may refer to the distance from the touch position A to the touch position B, and the continuous swiping distance is represented by the number of pixels experienced from the beginning of the touch-swiping operation. That is, the number of pixels included in the path from the touch position A to the touch position B is the continuous swiping distance in response to continuously swiping the current video content.

As an alternative and non-restrictive implementation mode, detecting the touch position in response to continuously swiping the current video content includes steps D1-D2.

In D1, detecting at least two reference sign positions when continuously swiping the current video content.

Figure 11:
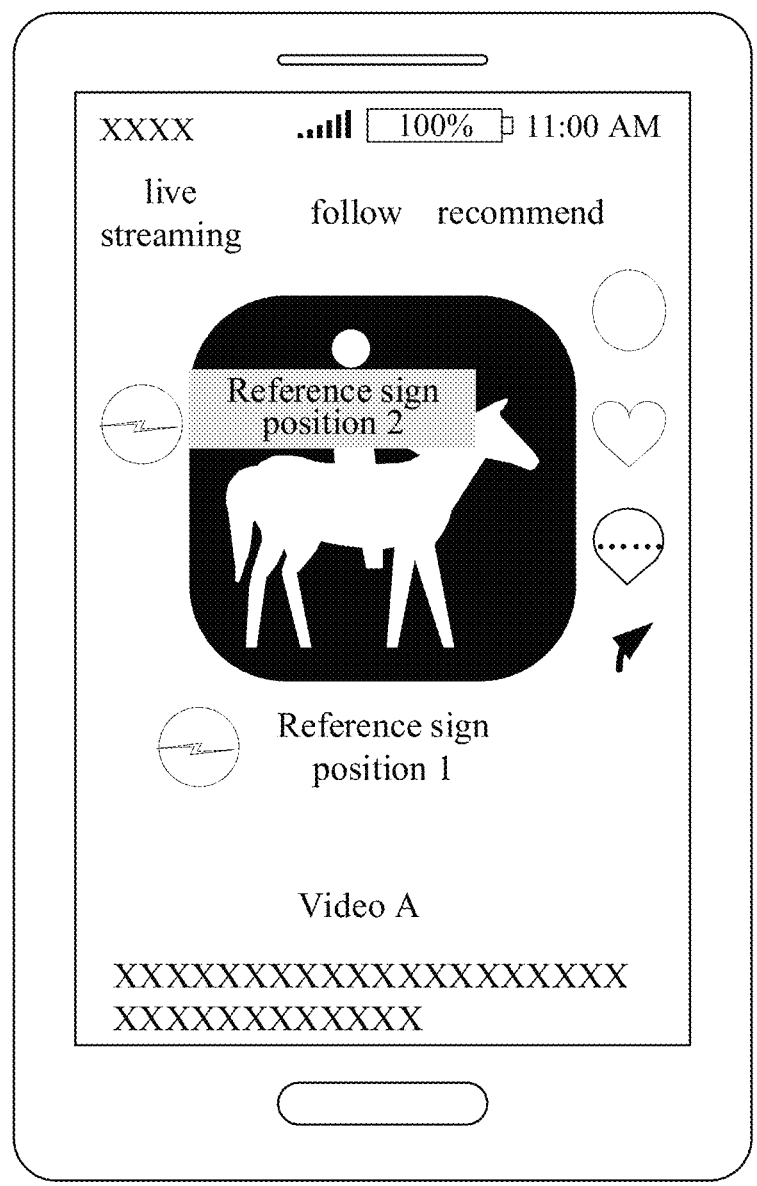
FIG. 11 is a schematic diagram of reference sign positions corresponding to continuous touch-swiping on the current video content according to embodiments of the present disclosure.

The at least two reference sign positions include a position of a reference sign on the current video content when starting the touch-swiping operation on the current video content and an updated position of the reference sign before the touch-swiping operation is finished. Referring to FIG. 11, continuously swiping from the reference sign position 1 to the reference sign position 2, the reference sign position 1 is the position of the reference sign when the touch-swiping operation is started on the current video content, and the reference sign position 2 is the updated position of the reference sign before the touch-swiping operation is finished on the current video content.

In D2, determining a continuous swiping distance when continuously swiping the current video content according to the at least two reference sign positions.

Referring to FIG. 11, the continuous swiping distance may refer to the distance from the reference sign position 1 to the reference sign position 2, that is, the number of pixels included in the path from the reference sign position 1 to the reference sign position 2 is the continuous swiping distance in response to continuously swiping the current video content.

In S230, beginning to display the preset event trigger region on the video playback page in response to the touch-swiping operation information meeting a preset swiping operation condition.

The preset swiping operation condition includes a first preset swiping operation condition and/or a second preset swiping operation condition. The first preset swiping operation condition includes: the continuous swiping distance is greater than a preset swiping distance, and/or a corresponding touch position when continuously performing touch-swiping operation entering a preset activation region on the video playback page, wherein the preset activation region is used for determining whether to start displaying the preset event trigger region. The second preset swiping operation condition includes whether an initial touch position of the touch-swiping operation is located in a preset starting region.

Figure 12:
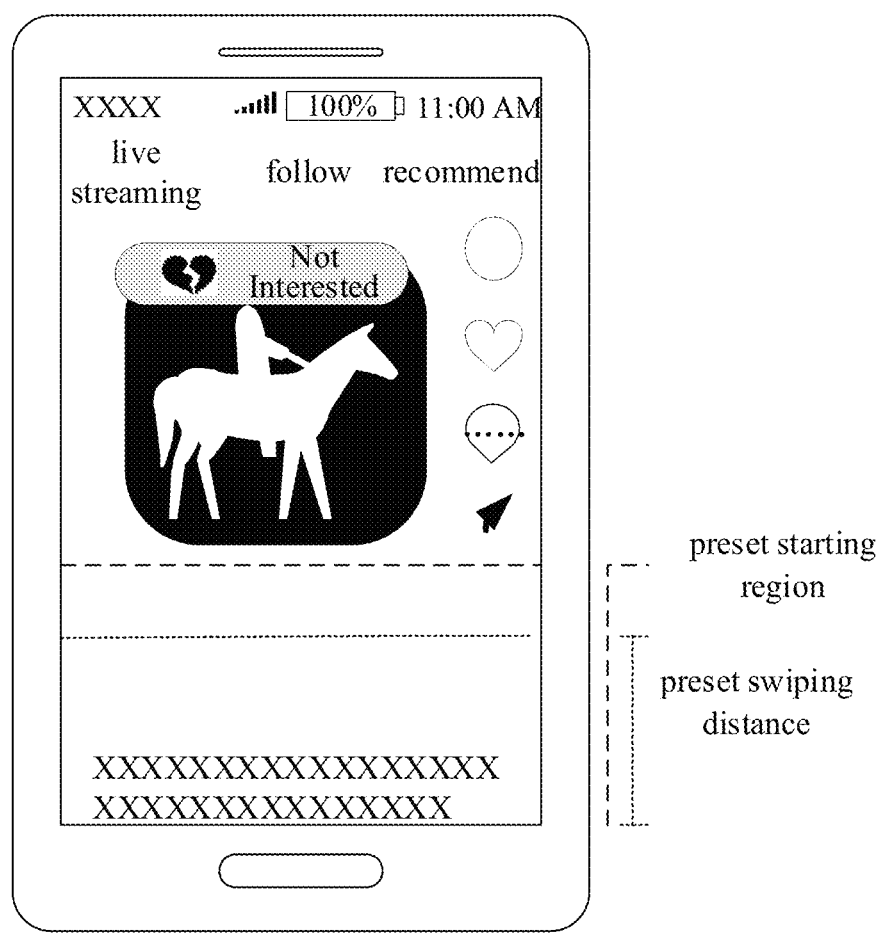
FIG. 12 is a schematic diagram of a preset swiping operation condition according to embodiments of the present disclosure.

The preset swiping distance may refer to the swiping distance of the current video content being a quarter of the video playback page, as shown in FIG. 12. The preset swiping distance may refer to the distance between a bottom of the current video content and a page bottom of the video playback page. When the swiping distance of the current video content exceeds the preset swiping distance, the preset event trigger region begins to be displayed on the video playback page.

Figure 13:
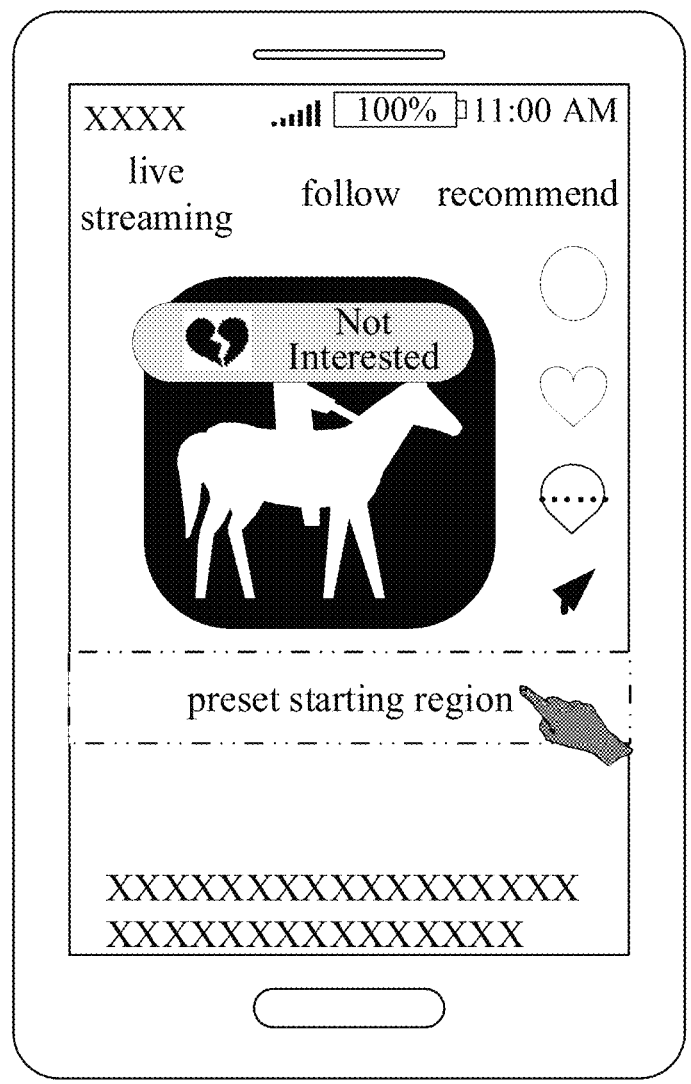
FIG. 13 is a schematic diagram illustrating a touch position entering a preset activation region according to embodiments of the present disclosure.

The preset activation region may be understood as when swiping the current video content, the touch position corresponding to the continuous touch-swiping operation enters the preset activation region, and then the preset event trigger region begins to be displayed on the video playback page. Referring to FIG. 13, when users perform touch-swiping operation on the video playback page, the touch position enters the preset activation region, and the "Not Interested" region will appear on the video playback page.

The preset starting region may refer to a position where the touch-swiping operation on the current video content begins. Referring to FIG. 12, the preset starting position may be within one-third of the region on the video playback page. If the position where the touch-swiping operation on the current video content begins is within the preset starting position, the preset event trigger region begins to be displayed on the video playback page.

By setting the preset swiping operation conditions including the preset swiping distance, the preset activation region and the preset starting region, when any one or more of the preset swiping operation conditions are met, the "Not Interested" region can be triggered. This provides users with timely prompts, making it easier for users to provide "Not Interested" feedback on the current video content.

In S240, performing preset event trigger control on the current video content through the preset event trigger region.

According to the video processing method provided by the embodiments of the present disclosure, by integrating the operation of swiping up the current video to watch the next video with the operation of triggering events like "Not Interested", the uninterested events can be quickly fed back when the video is swiped up, which reduces the operating cost for users to trigger the feedback of "Not Interested" events, thus improving the user's cognition, thus improving the user's feedback. By setting the preset swiping operation conditions including the preset swiping distance, the preset activation region and the preset starting region, when any one or more of the preset swiping operation conditions are met, the preset event trigger region can be triggered. This provides users with timely prompts, making it easier for users to provide feedback on the current video content. By adopting the technical scheme of the embodiments of the present disclosure, users can quickly provide feedback on the current video content while swiping the current video content, so the operational cost for users to provide feedback on "Not Interested" events is effectively reduced, thereby increasing the penetration rate of "Not Interested" signals and facilitating improved video recommendations.

Figure 14:
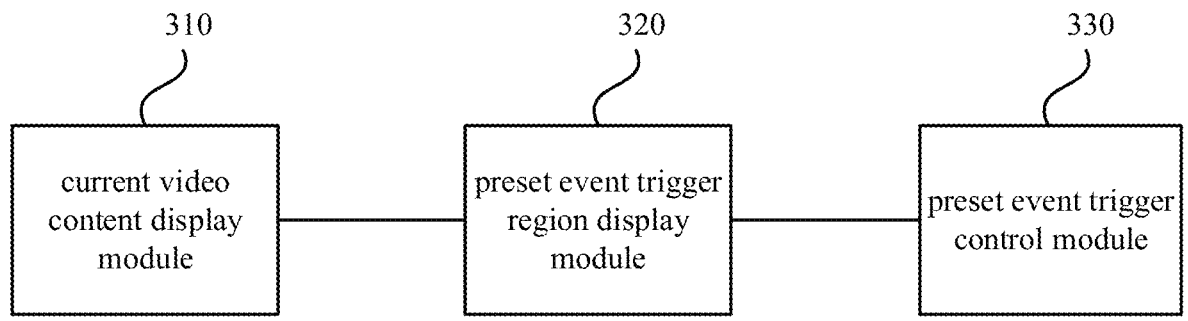
FIG. 14 is a structural diagram of a video processing apparatus according to embodiments of the present disclosure.

FIG. 14 is a structural diagram of a video processing apparatus according to the embodiments of the present disclosure. The embodiments of the present disclosure are suitable for triggering a preset event of a video. The apparatus can be implemented in the form of software and/or hardware and is integrated into any electronic device with a network communication function, such as a mobile terminal, a PC or a server. As shown in FIG. 14, the apparatus includes a current video content display module 310, a preset event trigger region display module 320, and a preset event trigger control module 330.

The current video content display module 310 is configured to display current video content on a video playback page;

the preset event trigger region display module 320 is configured to display a preset event trigger region on the video playback page in response to swiping the current video content; and the preset event trigger control module 330 is configured to perform preset event trigger control on the current video content through the preset event trigger region.

In an alternative scheme of the embodiments of the present disclosure, alternatively, the preset event trigger region display module 320 is configured to:
in response to detecting a touch-swiping operation applied to the current video content, make the current video content displayed on the video playback page begin to move in a preset direction so that the next video content begins to appear on the video playback page.

In an alternative scheme of the embodiments of the present disclosure, alternatively, the preset event trigger region display module 320 is further configured to:
detect touch-swiping operation information in response to performing touch-swiping operation on the current video content, wherein the touch-swiping operation information includes a continuous swiping distance and/or a touch position; and
begin to display the preset event trigger region on the video playback page in response to the touch-swiping operation information meeting a preset swiping operation condition.

In an alternative scheme of the embodiments of the present disclosure, alternatively, the preset event trigger region display module 320 is further configured to:
detect at least two reference touch positions when continuously swiping the current video content, wherein the at least two reference touch positions include a touch position when starting the touch-swiping operation on the current video content and a touch position before ending the touch-swiping operation;
determine a continuous swiping distance under the condition of continuously swiping the current video content according to the at least two reference touch positions.

In an alternative scheme of the embodiments of the present disclosure, alternatively, the preset event trigger region display module 320 is further configured to:
detect at least two reference sign positions when continuously swiping the current video content, wherein the at least two reference sign positions comprise a position of a reference sign on the current video content when starting the touch-swiping operation on the current video content and an updated position of the reference sign before ending the touch-swiping operation;
determine a continuous swiping distance when continuously swiping the current video content according to the at least two reference sign positions.

In an alternative scheme of the embodiments of the present disclosure, alternatively, the continuous swiping distance is represented by a number of pixels passed through from the beginning of the touch-swiping operation.

In an alternative scheme of the embodiments of the present disclosure, alternatively, the preset event trigger region display module 320 is further configured to:
detect a touch position when continuously performing touch-swiping operation on the current video content.

In an alternative scheme of the embodiments of the present disclosure, alternatively, the preset swiping operation condition comprises at least one selected from the group consisting of: a first preset swiping operation condition and a second preset swiping operation condition; wherein the first preset swiping operation condition comprises at least one selected from the group consisting of a continuous swiping distance being greater than a preset swiping distance, and a corresponding touch position when continuously performing touch-swiping operation entering a preset activation region on the video playback page, wherein the preset activation region is used for determining whether to start displaying the preset event trigger region; and the second preset swiping operation condition comprises whether an initial touch position of the touch-swiping operation is located in a preset starting region.

In an alternative scheme of the embodiments of the present disclosure, alternatively, the preset event trigger region display module 320 is further configured to:

in response to displaying the preset event trigger region on the video playback page, gradually adjust a region size of the preset event trigger region with sliding of the current video content.

In an alternative scheme of the embodiments of the present disclosure, alternatively, the preset event trigger region display module 320 is further configured to:

in response to displaying the preset event trigger region on the video playback page, gradually adjust a background color of the preset event trigger region with sliding of the current video content.

In an alternative scheme of the embodiments of the present disclosure, alternatively, a transparency of the preset event trigger region falls within a preset transparency range, allowing a part of the current video content blocked by the preset event trigger region to be faintly visible.

In an alternative scheme of the embodiments of the present disclosure, alternatively, the preset event trigger region display module 320 is further configured to:

synchronously display a preset event trigger prompt message to prompt that it is allowed to trigger a preset event for the current video content while swiping the current video content.

In an alternative scheme of the embodiments of the present disclosure, alternatively, the preset event trigger prompt message is displayed in the preset event trigger region.

In an alternative scheme of the embodiments of the present disclosure, alternatively, a relative distance between the preset event trigger region and a page bottom of the video playback page is preset based on a distribution of swiping actions on video content on the video playback page In an alternative scheme of the embodiments of the present disclosure, alternatively, the preset event trigger control module 330 is configured to:

after detect that performing touch-swiping operation on the current video content and the touch-swiping operation enters the preset event trigger region, trigger a preset event for the current video content displayed on the video playback page; or, after detect that a reference sign on the current video content enters the preset event trigger region, trigger the preset event for the current video content displayed on the video playback page.

In an alternative scheme of the embodiments of the present disclosure, alternatively, the preset event trigger control module 330 is further configured to:

trigger the preset event for the current video content displayed on the video playback page when waiting the touch-swiping operation to be finished in the preset event trigger region;

trigger the preset event for the current video content displayed on the video playback page when waiting for the reference sign entering the preset event trigger region being hidden, wherein the reference sign on the current video content is hidden when the touch-swiping operation is finished in the preset event trigger region.

In an alternative scheme of the embodiments of the present disclosure, alternatively, the preset event trigger control module 330 is further configured to:

perform state change processing on the preset event trigger region to indicate that the preset event has been triggered for the current video content.

In an alternative scheme of the embodiments of the present disclosure, alternatively, the preset event trigger control module 330 is further configured to:

control the preset event trigger region displayed on the video playback page to perform a picture shaking; and/or control a playing device for displaying the video playback page to provide tactile feedback.

The video processing apparatus provided by the embodiments can perform the video processing method provided by any embodiment of the present disclosure and has corresponding functional modules for executing the video processing method and relevant effects.

The plurality of units and modules included in the apparatus are categorized based on functional logic, but this classification is not restrictive, as long as corresponding functions can be realized. In addition, the names of multiple functional units are only for the convenience of distinguishing each other and are not used to limit the protection scope of the embodiments of the present disclosure.

Figure 15:
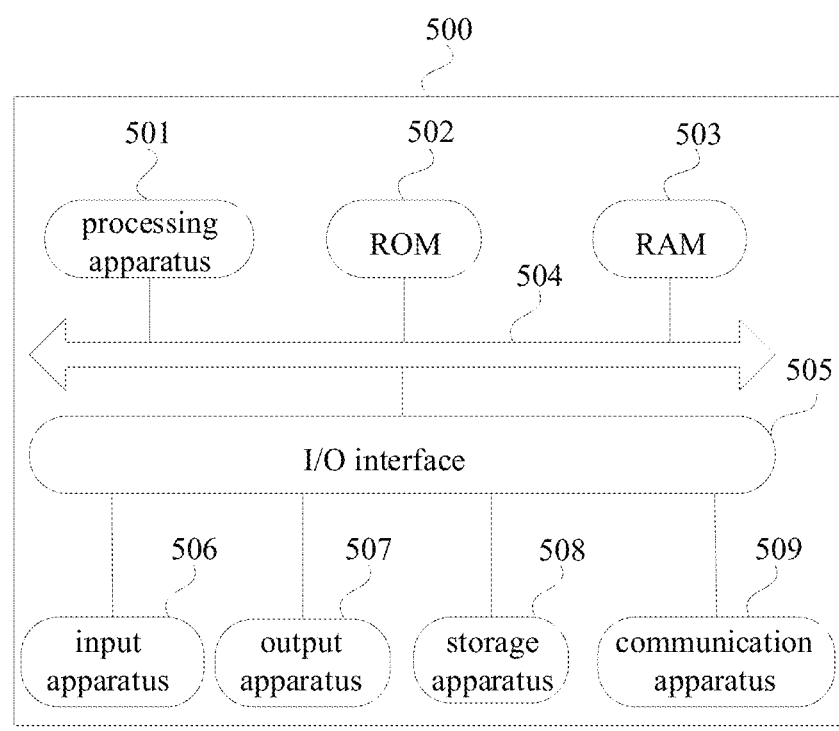
FIG. 15 is a structural diagram of an electronic device according to embodiments of the present disclosure.

FIG. 15 is a structural diagram of an electronic device according to embodiments of the present disclosure. Referring to FIG. 15, it is a structural diagram of an electronic device (for example, a terminal device or server in FIG. 15) 500 suitable for implementing the embodiments of the present disclosure. The terminal device in the embodiments of the present disclosure may include mobile terminals such as mobile phones, notebook computers, digital broadcast receivers, personal digital assistants (PDA), portable android devices (PAD), portable multimedia players (PMP), and vehicle-mounted terminals (such as vehicle-mounted navigation terminals), and fixed terminals such as digital television (TV) and desktop computers. The electronic device shown in FIG. 15 is only an example, and should not impose any limitations on the functionality and scope of use of the embodiments of the present disclosure.

As shown in FIG. 15, the electronic device 500 may include a processing apparatus (such as a central processing unit, and a graphics processor) 501, it may execute various appropriate actions and processes according to a program stored in a read-only memory (ROM) 502 or a program loaded from a storage apparatus 508 to a random access memory (RAM) 503. In RAM 503, various programs and data required for operations of the electronic device 500 are also stored. The processing apparatus 501, ROM 502, and RAM 503 are connected to each other by a bus 504. An input/output (I/O) interface 505 is also connected to the bus 504.

The following apparatuses may be connected to the I/O interface 505: an input apparatus 506 such as a touch screen, a touchpad, a keyboard, a mouse, a camera, a microphone, an accelerometer, and a gyroscope; an output apparatus 507 such as a liquid crystal display (LCD), a loudspeaker, and a vibrator; a storage apparatus 508 such as a magnetic tape, and a hard disk drive; and a communication apparatus 509. The communication apparatus 509 may allow the electronic device 500 to wireless-communicate or wire-communicate with other devices so as to exchange data. Although FIG. 15 shows the electronic device 500 with various apparatuses, it should be understood that it is not required to implement or possess all the apparatuses shown. Alternatively, it may implement or possess the more or less apparatuses.

According to the embodiment of the present disclosure, the process described above with reference to the flow diagram may be achieved as a computer software program. For example, an embodiment of the present disclosure includes a computer program product, it includes a computer program loaded on a non-transient computer-readable medium, and the computer program contains a program code for executing the video processing method shown in the flow diagram. In such an embodiment, the computer program may be downloaded and installed from the network by the communication apparatus 509, or installed from the storage apparatus 508, or installed from ROM 502. When the computer program is executed by the processing apparatus 501, the above functions defined in the video processing method in the embodiments of the present disclosure are executed.

The names of messages or information exchanged between multiple devices in the embodiments of the present disclosure are only for illustrative purposes and are not intended to limit the scope of these messages or information.

The electronic device provided in this embodiment and the video processing method provided in the above embodiment belong to the same concept. Technical details not described in this embodiment can be found in the above embodiment, and this embodiment has the same effects as the above embodiment.

Embodiments of the present disclosure provide a computer storage medium, on which a computer program is stored, which, when executed by a processor, realizes the video processing method provided in the above embodiment.

The above computer-readable medium in the present disclosure may be a computer-readable signal medium, a computer-readable storage medium, or any combination of the two. The computer-readable storage medium may be, for example, a system, an apparatus, or a device of electricity, magnetism, light, electromagnetism, infrared, semiconductor, or any combination of the above. The computer-readable storage medium may include an electric connector with one or more wires, a portable computer magnetic disk, a hard disk drive, RAM, ROM, an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including a wire, an optical cable, a radio frequency (RF) or the like, or any suitable combinations of the above.

In some implementation modes, a client and a server may be communicated by using any currently known or future-developed network protocols such as a Hypertext Transfer Protocol (HTTP), and may interconnect with any form or medium of digital data communication (such as a communication network). Examples of communication network include a local region network ("LAN"), a wide region network ("WAN"), an internetwork (such as the Internet), and an end-to-end network (such as an ad hoc end-to-end network), as well as any current known or future-developed networks.

The above-described computer-readable medium may be included in the above-described electronic device or may also exist alone without being assembled into the electronic device.

The above-described computer-readable medium carries one or more programs, and when the one or more programs are executed by the electronic device, the electronic device is caused to: display current video content on a video playback page; display a preset event trigger region on the video playback page in response to swiping the current video content; and perform preset event trigger control on the current video content through the preset event trigger region.

The computer program code for executing the operation of the present disclosure may be written in one or more programming languages or combinations thereof, the above programming language includes object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flowchart and block diagrams in the drawings illustrate architectures, functions and operations of possible implementations of the systems, methods and the computer each block in the flowchart or block diagram may represent a part of a module, a program segment, or codes, which includes one or more executable instructions for implementing specified logical functions. It is also noted that, in some alternative implementations, the functions noted in the block may occur out of the order noted in the figures. For example, two blocks shown in succession may, in fact, be executed substantially in parallel, and may sometimes be executed in the reverse order, depending on the functions involved. It is also noted that each block in the block diagrams and/or flowcharts, and combinations of blocks in the block diagrams and/or flow diagrams, may be implemented by a dedicated hardware-based system that performs specified functions or operations, or by a combination of dedicated hardware and computer instructions.

The units involved in the embodiments described in the present disclosure may be implemented by software or hardware. The name of the unit does not constitute a limitation on the unit itself in some cases. For example, a first acquisition unit can also be described as "a unit that acquires at least two Internet protocol addresses".

The functions described above herein may be at least partially performed by one or more hardware logic components. For example, without limitation, exemplary types of hardware logic components that may be used include: a field programmable gate array (FPGA), an application-specific integrated circuit (ASIC), an application specific standard product (ASSP), a system-on-chip (SOC), a complex programmable logic device (CPLD) and the like.

In the context of the present disclosure, the machine-readable medium may be a tangible medium that may include or store a program used by or in connection with an instruction execution system, apparatus or device. The machine-readable medium may be a machine-readable signal medium or a machine-readable storage medium. The machine-readable medium may include, but not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a convenient compact disk read-only memory (CD-ROM), an optical storage device, a magnetic storage device, or any suitable combination of the above.

According to one or more embodiments of the present disclosure, Example 1 provides a video processing method, including:
  displaying current video content on a video playback page;
  displaying a preset event trigger region on the video playback page in response to swiping the current video content; and
  performing preset event trigger control on the current video content through the preset event trigger region.

Example 2 according to the method described in Example 1, before displaying a preset event trigger region on the video playback page, further including:
  when detecting a touch-swiping operation applied to the current video content, making the current video content displayed on the video playback page begin to slide in a preset direction to make the next video content begin to appear on the video playback page.

Example 3 according to the method described in Example 1, the displaying a preset event trigger region on the video playback page in response to swiping the current video content, including:
  detecting touch-swiping operation information in response to performing touch-swiping operation on the current video content, wherein the touch-swiping operation information comprises at least one selected from the group consisting of a continuous swiping distance and a touch position; and
  beginning to display the preset event trigger region on the video playback page in response to the touch-swiping operation information meeting a preset swiping operation condition.

Example 4 according to the method described in Example 3, detecting touch-swiping operation information in response to performing touch-swiping operation on the current video content, including:
  detecting at least two reference touch positions when continuously swiping the current video content, wherein the at least two reference touch positions comprise a touch position when starting the touch-swiping operation on the current video content and a touch position before ending the touch-swiping operation;
  determining a continuous swiping distance under a condition of continuously swiping the current video content according to the at least two reference touch positions.

Example 5 according to the method described in Example 3, the detecting touch-swiping operation information in response to performing touch-swiping operation on the current video content, including:
  detecting at least two reference sign positions when continuously swiping the current video content, wherein the at least two reference sign positions comprise a position of a reference sign on the current video content when starting the touch-swiping operation on the current video content and an updated position of the reference sign before ending the touch-swiping operation;
  determining a continuous swiping distance when continuously swiping the current video content according to the at least two reference sign positions.

Example 6 according to the method described in Example 4 or example 5, the continuous swiping distance is represented by a number of pixels passed through from a beginning of the touch-swiping operation.

Example 7 according to the method described in Example 3, detecting touch-swiping operation information in response to performing touch-swiping operation on the current video content, including:
  detecting a touch position when continuously performing touch-swiping operation on the current video content.

Example 8 according to the method described in Example 3, the preset swiping operation condition comprises at least one selected from the group consisting of: a first preset swiping operation condition and a second preset swiping operation condition; wherein the first preset swiping operation condition comprises at least one selected from the group consisting of: a continuous swiping distance being greater than a preset swiping distance, and a corresponding touch position when continuously performing touch-swiping operation entering a preset activation region on the video playback page, wherein the preset activation region is used for determining whether to start displaying the preset event trigger region; and the second preset swiping operation condition comprises whether an initial touch position of the touch-swiping operation is located in a preset starting region.

Example 9 according to the method described in Example 1, displaying a preset event trigger region on the video playback page, further including:
  in response to displaying the preset event trigger region on the video playback page, gradually adjusting a region size of the preset event trigger region with sliding of the current video content.

Example 10 according to the method described in Example 1, the displaying a preset event trigger region on the video playback page, further including:
  in response to displaying the preset event trigger region on the video playback page, gradually adjusting a background color of the preset event trigger region with sliding of the current video content.

Example 11 according to the method described in Example 1, a transparency of the preset event trigger region falls within a preset transparency range, allowing a part of the current video content blocked by the preset event trigger region to be blurred but visible.

Example 12 according to the method described in Example 1, in response to displaying the preset event trigger region on the video playback page, the method further comprises:
synchronously displaying a preset event trigger prompt message to prompt that it is allowed to trigger a preset event for the current video content while swiping the current video content.

Example 13 according to the method described in Example 12, the preset event trigger prompt message is displayed in the preset event trigger region.

Example 14 according to the method described in Example 1, a relative distance between the preset event trigger region and a page bottom of the video playback page is preset based on a distribution of swiping actions on video content on the video playback page.

Example 15 according to the method described in Example 1, performing preset event trigger control on the current video content through the preset event trigger region, including:
after detecting that performing touch-swiping operation on the current video content and the touch-swiping operation enters the preset event trigger region, triggering a preset event for the current video content displayed on the video playback page; or,
after detecting that a reference sign on the current video content enters the preset event trigger region, triggering the preset event for the current video content displayed on the video playback page.

Example 16 according to the method described in Example 15, triggering the preset event for the current video content displayed on the video playback page, including:
triggering the preset event for the current video content displayed on the video playback page when waiting for the touch-swiping operation being finished in the preset event trigger region;
triggering the preset event for the current video content displayed on the video playback page when waiting for the reference sign entering the preset event trigger region to be hidden, wherein the reference sign on the current video content is hidden when the touch-swiping operation is finished in the preset event trigger region.

Example 17 according to the method described in Example 15, when triggering the preset event for the current video content displayed on the video playback page, the method further including:
performing state change processing on the preset event trigger region to indicate that the preset event has been triggered for the current video content.

Example 18 according to the method described in Example 1, when triggering the preset event for the current video content displayed on the video playback page, the method further including:
controlling the preset event trigger region displayed on the video playback page to perform a picture shaking; and/or
controlling a playing device for displaying the video playback page to provide tactile feedback.

According to one or more embodiments of the present disclosure, Example 19 also provides a video processing apparatus, and the video processing apparatus includes:
a current video content display module, configured to display current video content on a video playback page;
a preset event trigger region display module, configured to display a preset event trigger region on the video playback page in response to swiping the current video content; and
a preset event trigger control module, configured to perform preset event trigger control on the current video content through the preset event trigger region.

According to one or more embodiments of the present disclosure, Example 20 also provides an electronic device, and the electronic device includes:
one or more processors; and
a memory configured to store one or more programs, wherein
the one or more programs, when executed by the one or more processors, cause the
one or more processors to implement the video processing method according to any one of Examples 1-18.

According to one or more embodiments of the present disclosure, Example 21 also provides a storage medium containing computer-executable instructions, and the computer-executable instructions, when executed by a computer processor, perform the video processing method according to any one of Examples 1-18.

Furthermore, although a plurality of operations are depicted in a particular order, this should not be understood as requiring that these operations be performed in the particular order shown or in a sequential order. Under certain circumstances, multitasking and parallel processing may be beneficial. Likewise, although numerous implementation details are included in the above discussion, these should not be construed as limiting the scope of the present disclosure. Some features described in the context of separate embodiments can also be implemented in combination in a single embodiment. On the contrary, various features described in the context of a single embodiment can also be implemented in multiple embodiments individually or in any suitable sub-combination.

Although the subject matter has been described in language specific to structural features and/or methodological logical acts, it should be understood that the subject matter defined in the appended claims is not necessarily limited to the specific features or acts described above. On the contrary, the specific features and actions described above are only exemplary forms of implementing the claims.

The invention claimed is:

1. A video processing method, comprising:
displaying current video content on a video playback page;
displaying a preset event trigger region on the video playback page in response to swiping the current video content; and
performing a preset event trigger control on the current video content through the preset event trigger region, comprising:
after detecting a performing of a touch-swiping operation on the current video content and the touch-swiping operation enters the preset event trigger region, triggering a preset event for the current video content displayed on the video playback page, wherein the touch-swiping operation comprises sliding the current video content into the preset event trigger region.

2. The method according to claim 1, wherein displaying the preset event trigger region on the video playback page in response to swiping the current video content, comprises:
detecting touch-swiping operation information in response to performing the touch-swiping operation on the current video content, wherein the touch-swiping operation information comprises at least one selected from the group consisting of a continuous swiping distance and a touch position; and beginning to display the preset event trigger region on the video playback page in response to the touch-swiping operation information meeting a preset swiping operation condition.

3. The method according to claim 1, wherein displaying the preset event trigger region on the video playback page, further comprises:
in response to displaying the preset event trigger region on the video playback page, adjusting a region size of the preset event trigger region with sliding of the current video content.

4. The method according to claim 1, wherein displaying the preset event trigger region on the video playback page, further comprises:
in response to displaying the preset event trigger region on the video playback page, adjusting a background color of the preset event trigger region with sliding of the current video content.

5. The method according to claim 1, wherein a transparency of the preset event trigger region falls within a preset transparency range, allowing a part of the current video content blocked by the preset event trigger region to be faintly visible.

6. The method according to claim 1, wherein, in response to displaying the preset event trigger region on the video playback page, the method further comprises:
displaying a preset event trigger prompt message to prompt that it is allowed to trigger the preset event for the current video content while swiping the current video content.

7. The method according to claim 6, wherein the preset event trigger prompt message is displayed in the preset event trigger region.

8. The method according to claim 1, wherein performing the preset event trigger control on the current video content through the preset event trigger region further comprises:
after detecting that a reference sign on the current video content enters the preset event trigger region, triggering the preset event for the current video content displayed on the video playback page.

9. The method according to claim 8, wherein triggering the preset event for the current video content displayed on the video playback page comprises:
triggering the preset event for the current video content displayed on the video playback page when waiting for the touch-swiping operation being finished in the preset event trigger region;
triggering the preset event for the current video content displayed on the video playback page when waiting for the reference sign entering the preset event trigger region being hidden, wherein the reference sign on the current video content is hidden when the touch-swiping operation is finished in the preset event trigger region.

10. The method according to claim 8, wherein, when triggering the preset event for the current video content displayed on the video playback page, the method further comprises:
performing state change processing on the preset event trigger region to indicate that the preset event has been triggered for the current video content.

11. The method according to claim 8, wherein, when triggering the preset event for the current video content displayed on the video playback page, the method further comprises at least one of:
controlling the preset event trigger region displayed on the video playback page to perform a picture shaking; or controlling a playing device for displaying the video playback page to provide tactile feedback.

12. The method according to claim 2, wherein detecting the touch-swiping operation information in response to performing the touch-swiping operation on the current video content comprises:
detecting at least two reference touch positions when continuously swiping the current video content, wherein the at least two reference touch positions comprise a touch position when starting the touch-swiping operation on the current video content and a touch position before ending the touch-swiping operation;
determining the continuous swiping distance under a condition of continuously swiping the current video content according to the at least two reference touch positions.

13. The method according to claim 2, wherein detecting the touch-swiping operation information in response to performing the touch-swiping operation on the current video content comprises:
detecting at least two reference sign positions when continuously swiping the current video content, wherein the at least two reference sign positions comprise a position of a reference sign on the current video content when starting the touch-swiping operation on the current video content and an updated position of the reference sign before the touch-swiping operation is finished;
determining the continuous swiping distance when continuously swiping the current video content according to the at least two reference sign positions.

14. The method according to claim 12, wherein the continuous swiping distance is represented by a number of pixels passed through from a beginning of the touch-swiping operation.

15. The method according to claim 2, wherein detecting the touch-swiping operation information in response to performing the touch-swiping operation on the current video content comprises:
detecting the touch position when continuously performing the touch-swiping operation on the current video content.

16. The method according to claim 2, wherein the preset swiping operation condition comprises at least one selected from a group consisting of: a first preset swiping operation condition and a second preset swiping operation condition;
wherein the first preset swiping operation condition comprises at least one selected from a group consisting of: the continuous swiping distance being greater than a preset swiping distance, and a corresponding touch position when continuously performing the touch-swiping operation entering a preset activation region on the video playback page, wherein the preset activation region is used for determining whether to start displaying the preset event trigger region; and
the second preset swiping operation condition comprises whether an initial touch position of the touch-swiping operation is located in a preset starting region.

17. The method according to claim 1, wherein, before displaying the preset event trigger region on the video playback page, the method further comprises:
when detecting the touch-swiping operation applied to the current video content, making the current video content displayed on the video playback page begin to slide in a preset direction to make next video content begin to appear on the video playback page.

18. The method according to claim 1, wherein a relative distance between the preset event trigger region and a page bottom of the video playback page is preset based on a distribution of swiping actions on video content on the video playback page.

19. An electronic device, comprising:
one or more processors; and
a memory configured to store one or more programs, wherein the one or more programs, when executed by the one or more processors, cause the one or more processors to implement a video processing method, wherein the video processing method comprises:
displaying current video content on a video playback page;
displaying a preset event trigger region on the video playback page in response to swiping the current video content; and
performing a preset event trigger control on the current video content through the preset event trigger region comprising:
after detecting a performing of a touch-swiping operation on the current video content and the touch-swiping operation enters the preset event trigger region, triggering a preset event for the current video content displayed on the video playback page, wherein the touch-swiping operation comprises sliding the current video content into the preset event trigger region.

20. A storage medium containing computer-executable instructions, wherein the computer-executable instructions, when executed by a computer processor, perform a video processing method,
wherein the video processing method comprises:
displaying current video content on a video playback page;
displaying a preset event trigger region on the video playback page in response to swiping the current video content; and
performing a preset event trigger control on the current video content through the preset event trigger region, comprising:
after detecting a performing of a touch-swiping operation on the current video content and the touch-swiping operation enters the preset event trigger region, triggering a preset event for the current video content displayed on the video playback page, wherein the touch-swiping operation comprises sliding the current video content into the preset event trigger region.

* * * * *